(No Model.)

L. J. HIRT.
NAIL MACHINE.

No. 341,658. Patented May 11, 1886.

WITNESSES
H. G. Phillips.
J. E. Sharpe.

INVENTOR
L. J. Hirt,
by Geo. B. Selden
Attorney (No Model.)

7 Sheets—Sheet 3.

L. J. HIRT.
NAIL MACHINE.

No. 341,658.  Patented May 11, 1886.

WITNESSES
H. G. Phillips.
J. E. Sharpe.

INVENTOR
L. J. Hirt
by Geo. B. Selden,
Attorney

N. PETERS, Photo-Lithographer, Washington, D. C.

(No Model.) 7 Sheets—Sheet 4.
L. J. HIRT.
NAIL MACHINE.
No. 341,658. Patented May 11, 1886.
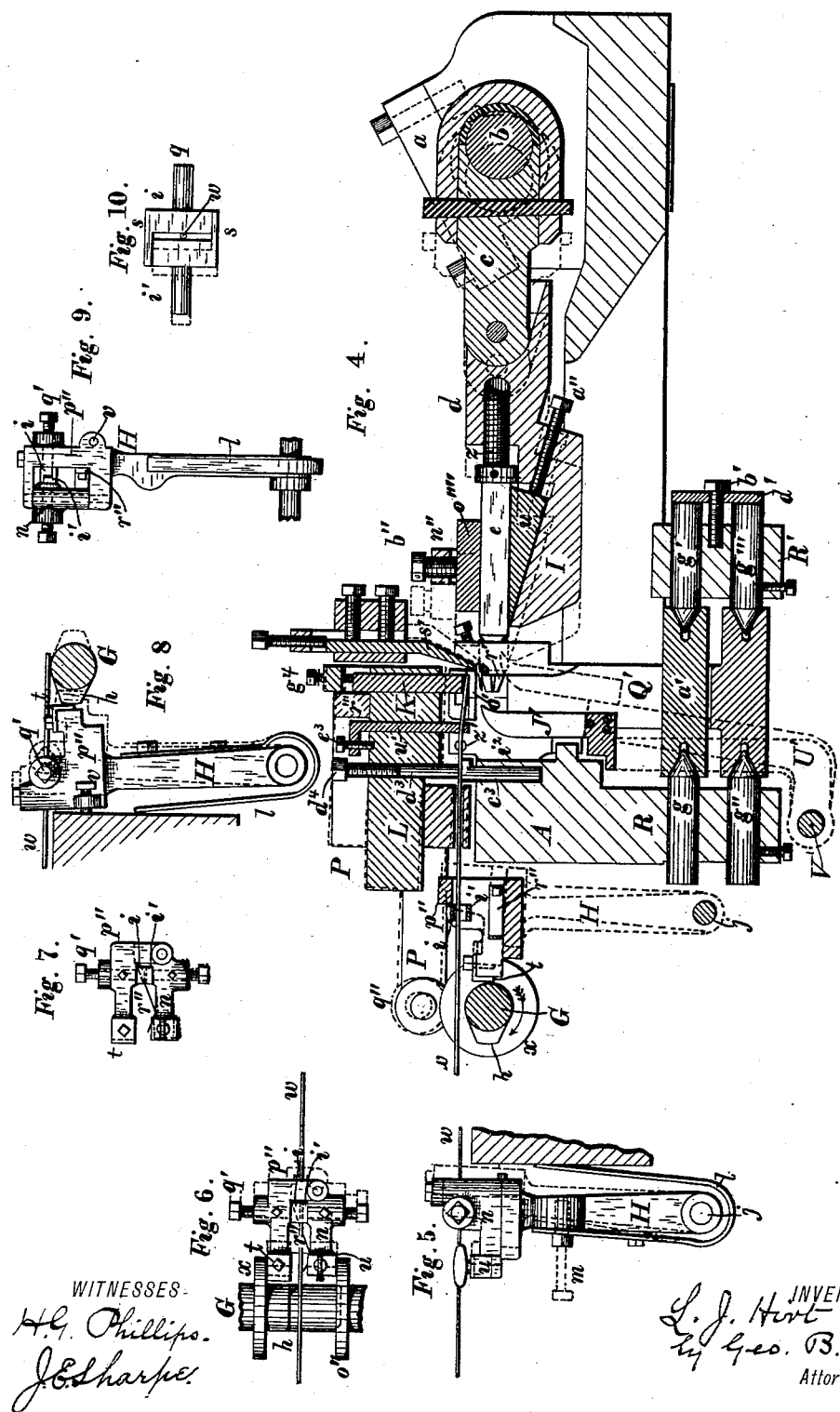
WITNESSES
H. G. Phillips.
J. E. Sharpe.
INVENTOR
L. J. Hirt
by Geo. B. Selden,
Attorney (No Model.) 7 Sheets—Sheet 5.
L. J. HIRT.
NAIL MACHINE.
No. 341,658. Patented May 11, 1886.
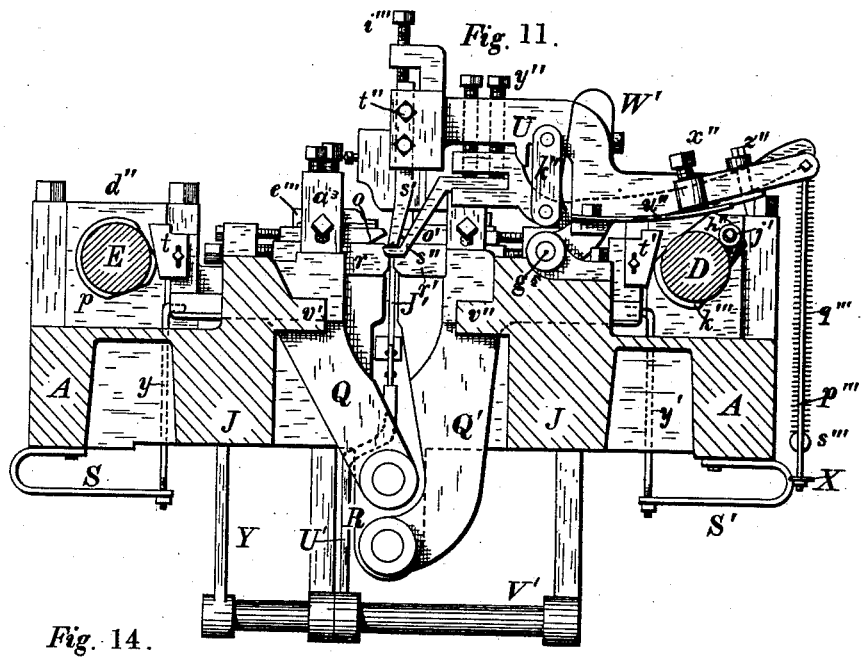
Fig. 11.
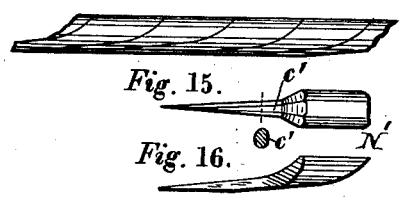
Fig. 14.
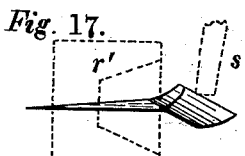
Fig. 15.
Fig. 16.
Fig. 17.
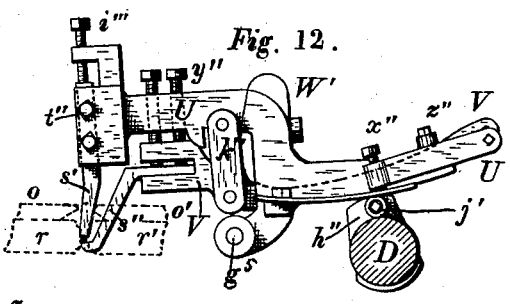
Fig. 12.
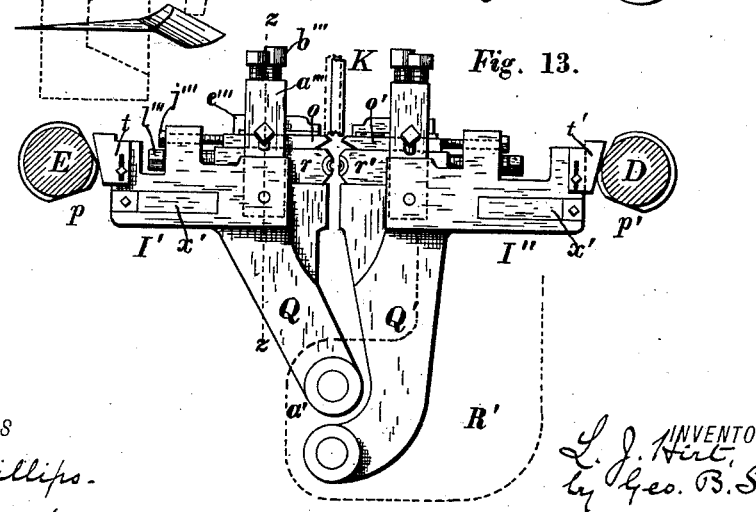
Fig. 13.
WITNESSES
H. G. Phillips.
J. E. Sharpe.
INVENTOR
L. J. Hirt,
by Geo. B. Selden,
Attorney (No Model.)  
7 Sheets—Sheet 6.
L. J. HIRT.
NAIL MACHINE.
No. 341,658.  
Patented May 11, 1886.
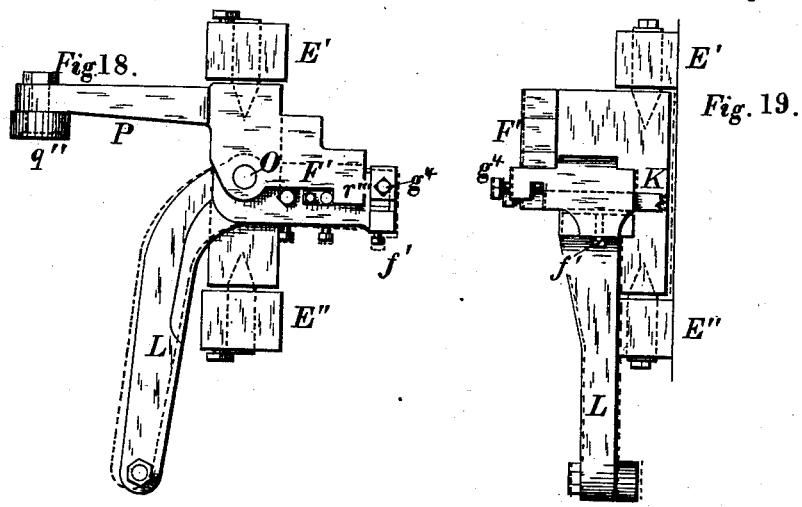
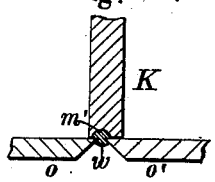
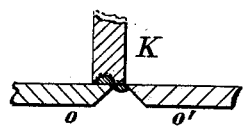
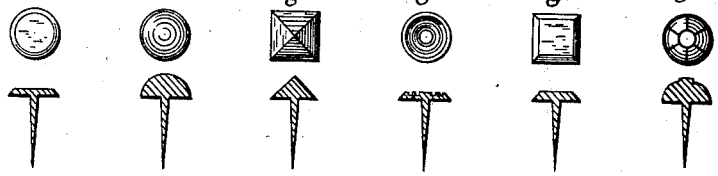
   
WITNESSES  
H. G. Phillips.  
J. E. Sharpe.
INVENTOR  
L. J. Hirt,  
by Geo. B. Selden,  
Attorney (No Model.)　　　　　　　　　　　　　　7 Sheets—Sheet 7.
L. J. HIRT.
NAIL MACHINE.
No. 341,658.　　　　　　　　　　　Patented May 11, 1886.
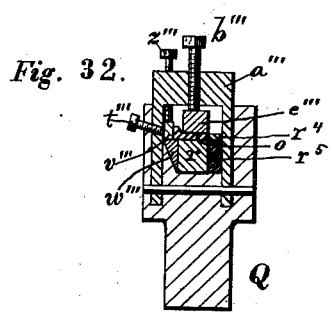
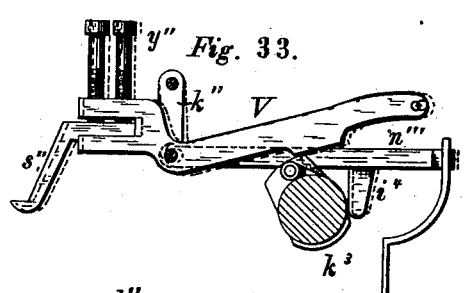
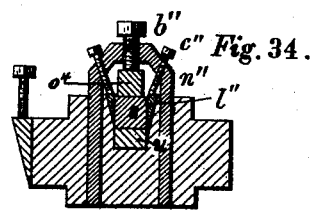
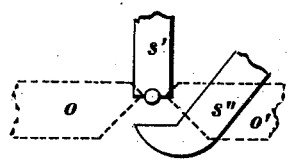
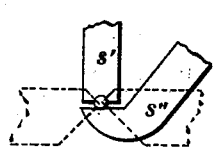
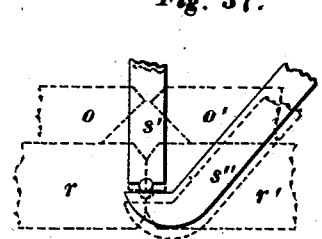
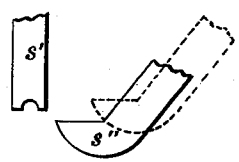
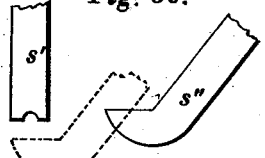
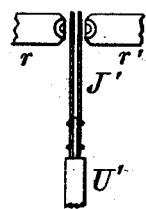
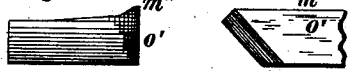
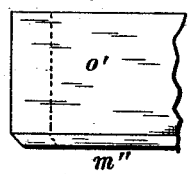
WITNESSES
H. G. Phillips.
J. E. Sharpe.
INVENTOR
L. J. Hirt,
by Geo. B. Selden,
Attorney

UNITED STATES PATENT OFFICE.

LOUIS J. HIRT, OF ROCHESTER, NEW YORK, ASSIGNOR OF FOUR FIFTHS TO LEWIS M. LOSS, OF SAME PLACE.

NAIL-MACHINE.

SPECIFICATION forming part of Letters Patent No. 341,658, dated May 11, 1886.

Application filed February 13, 1886. Serial No. 191,796. (No model.)

*To all whom it may concern:*

Be it known that I, LOUIS J. HIRT, a citizen of the Republic of France, residing at Rochester, in the county of Monroe and State of New York, have invented certain Improvements in Machines and Processes for Making Nails, of which the following is a specification, reference being had to the accompanying drawings.

My invention relates to certain improvements in processes and machinery for making nails, relative to that class of nail-machines which are designed to make solid-headed shoe, upholsterers', or other nails or tacks from a wire or rod, which improved processes and machinery are fully described and illustrated in the following specification and the accompanying drawings, and the novel features thereof specified in the claims annexed to the said specification.

Figure 1:
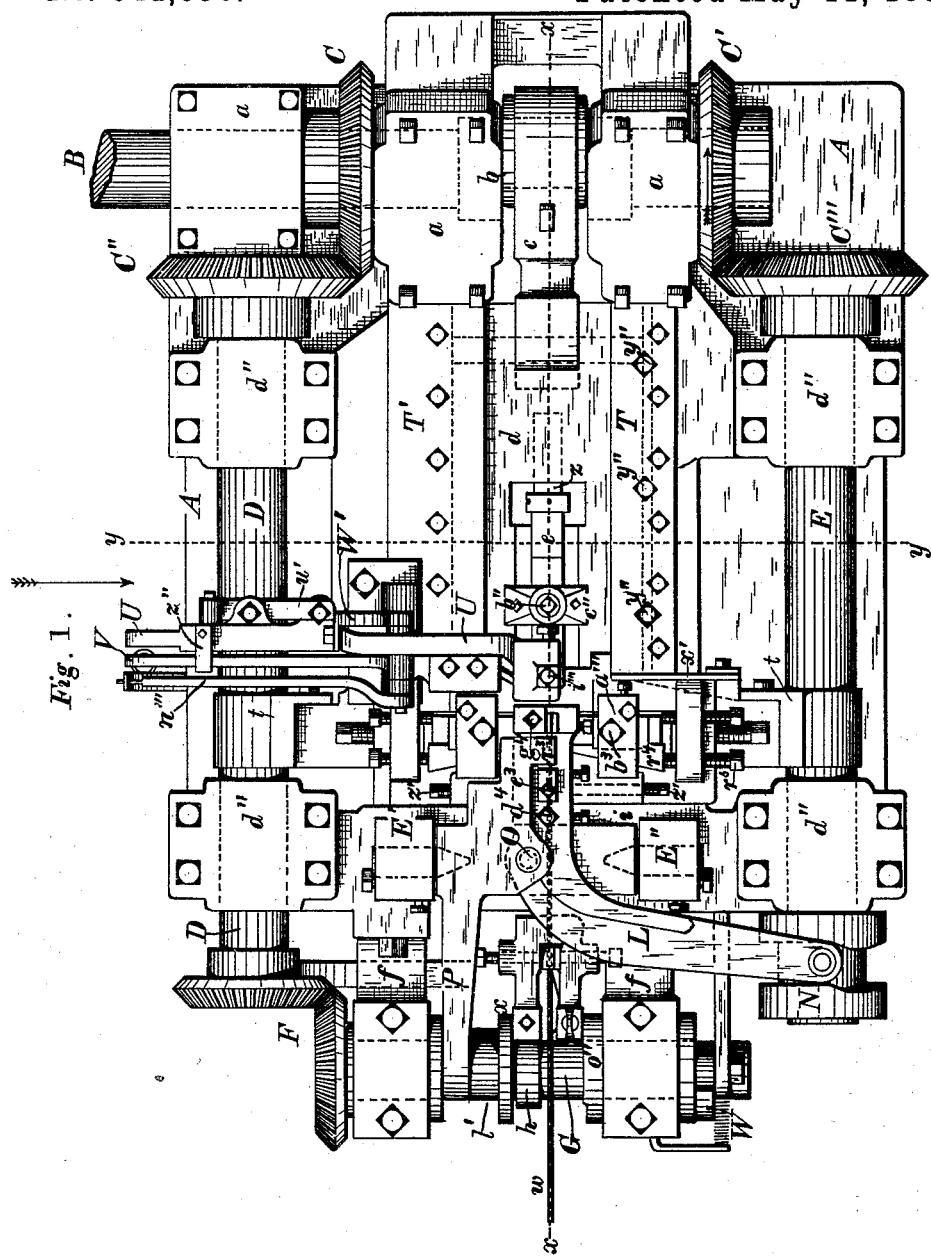
Figure 2:
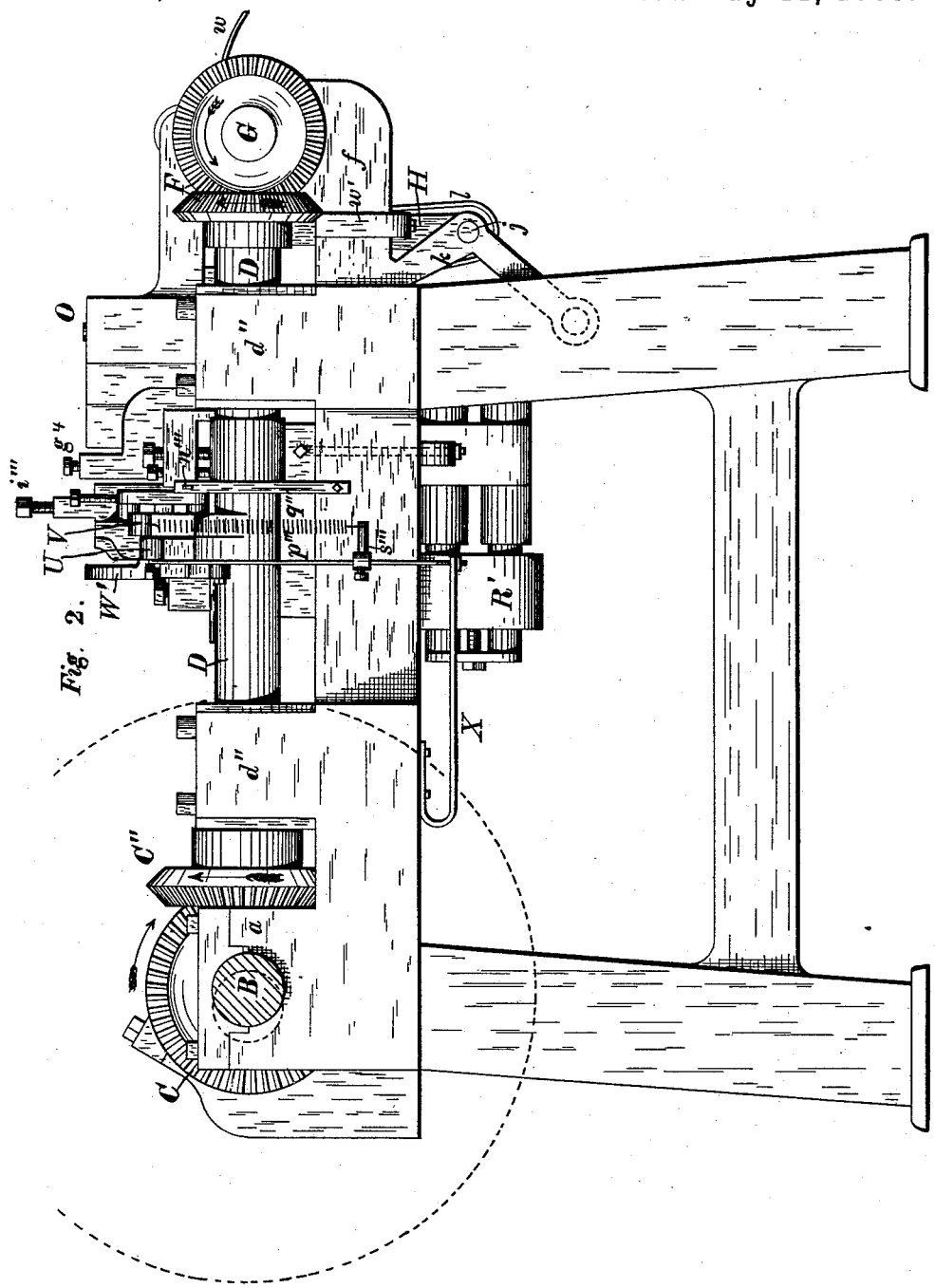
Figure 3:
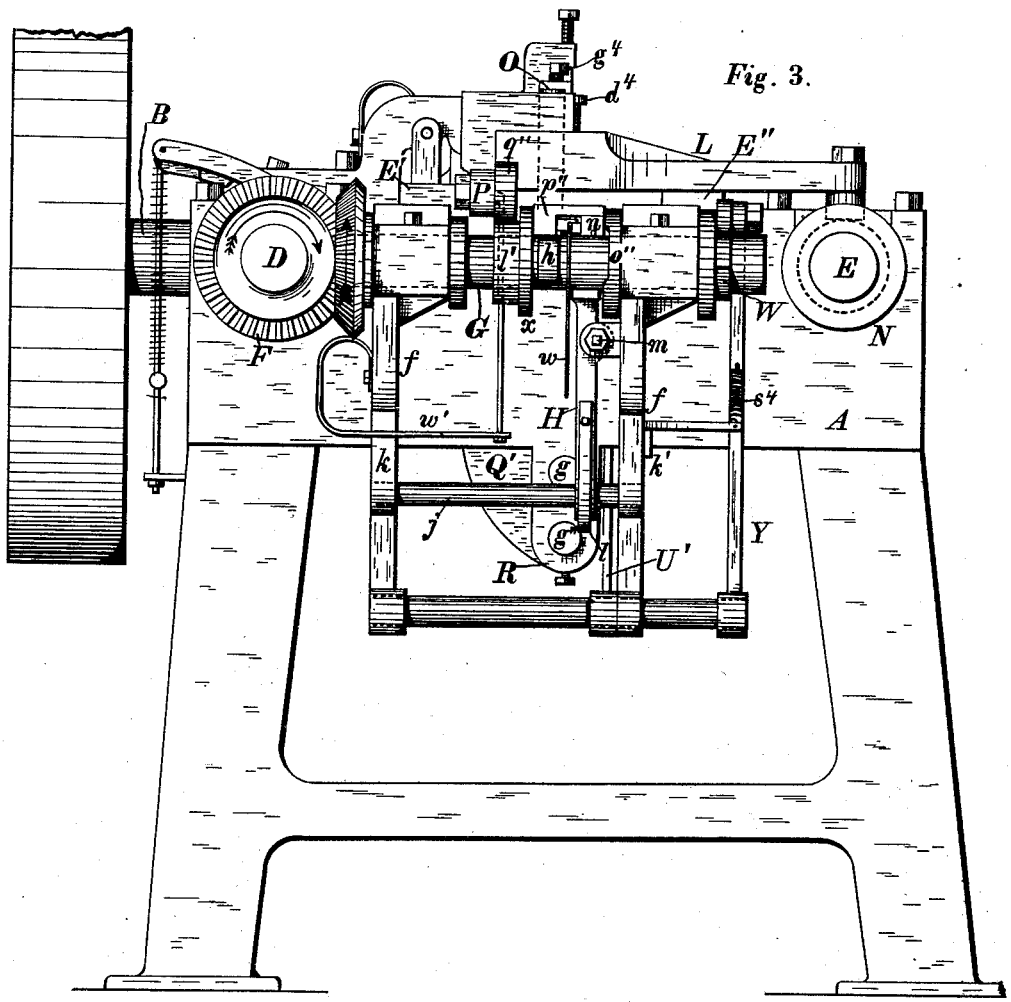

In the accompanying drawings, representing my improvements in wire-nail machines, Figure 1 is a plan view. Fig. 2 is a side elevation of the machine as seen in the direction indicated by the arrow in Fig. 1. Fig. 3 is an end elevation of the machine as seen from the left hand in Fig 1. Fig. 4 is a longitudinal section of the machine on the line *x x*, Fig. 1. Fig. 5 is a side elevation of the feeding mechanism detached. Fig. 6 is a plan view of the feed mechanism detached. Fig. 7 is a plan view of the feed mechanism detached, showing the position of the parts when the feeding-jaws are open in dotted lines. Fig. 8 is a side elevation of the feed mechanism as seen from the side opposite to that shown in Fig. 5. Fig. 9 is an elevation of the feed mechanism detached, as seen from the side next the frame of the machine. Fig. 10 represents the wire-feeding jaws. Fig. 11 is a transverse section of the machine on the line *y y*, Fig. 1, showing the parts to the left hand of that line, the slide which carries the heading-die being omitted. Fig. 12 represents the blank-carrying mechanism in elevation. Fig. 13 represents the wire-cutting mechanism detached. Fig. 14 is a diagram representing the manner of cutting the wire. Figs. 15 and 16 represent the nail-blank as cut from the wire in different positions. Fig. 17 represents the nail-blank after the head has been bent over. Fig. 18 represents the mechanism for operating the wire-shearing block in plan detached. Fig. 19 represents the same as seen from the right hand in Fig. 18. Figs. 20 and 21 are sectional diagrams illustrating the manner of shearing the blank from the wire. Figs. 22, 23, 24, 25, 26, and 27 represent different forms of the nails or tacks which may be made by my improvements. Figs. 28, 29, 30, and 31 are cross-sections of the wire, showing different forms given to it by the shaping mechanism. Fig. 32 is a section through one of the cutter-arms on the line *z z*, Fig. 13. Fig. 33 is an elevation of one of the levers of the blank-carrying mechanism detached. Fig. 34 is a transverse section of the reciprocating cross-head or slide which carries the heading-die. Figs. 35, 36, 37, 38, and 39 represent the different positions occupied by the jaws of the blank-carrying mechanism during the operations of feeding the wire, of transferring the blank from the cutters to the gripping-dies, and of bending over the head of the blank. Fig. 40 is an end view of one of the cutters. Fig. 41 is a side view of the same. Fig. 42 is a plan view of the same. Fig. 43 is an elevation of the discharger.

In the accompanying drawings, A represents the frame or bed-plate of my improved nail-machine, which sustains the various operative parts, which consist, essentially, of wire-feeding mechanism, wire cutting and shearing mechanism, blank carrying and bending mechanism, and dies for holding the blank during the operation of a reciprocating head-forming die.

B, Figs. 1 and 2, is the main driving-shaft, by which power is applied to the machine. It is provided with suitable band-pulleys and a fly-wheel, as indicated in Fig. 3. A suitable clutch may also be used on the shaft B, so that the motion of the machine may be stopped instantly, if desired. The shaft B is arranged to rotate in suitable journals, *a a*, on the bed-plate of the machine, being provided with a crank, *b*, from which, by means of the connection *c*, a reciprocating motion is transmitted to the slide *d*, carrying the head-forming die *e*. The shaft B is provided on each side of the machine with bevel-gears C C', from which, by the corresponding bevels, C''

C''', motion is transmitted to the parallel shafts D and E, arranged on the opposite sides of the machine, by which the cutting, shearing, and blank-carrying mechanism are operated. At its end the shaft D is provided with the bevel-gears F, from which motion is transmitted to the shaft G, which actuates the feeding mechanism and also the discharger. The shafts D E are arranged to rotate in suitable boxes, $d''$, on the frame of the machine at the same rate of speed with the main driving-shaft B. The shaft G is sustained from the frame or bed-plate by suitable arms or brackets, $f f$, Fig. 1.

The operation of the various parts is so timed relative to each other that a complete nail is formed from the wire at each revolution of the main driving-shaft B.

In the operation of the machine the wire $w$ is fed into the machine by the feeding mechanism, and after being severed by the cutting and shearing devices on the lines of cut indicated in Fig. 14, thereby forming a blank of a form substantially similar to that represented in Figs. 15 and 16, the blank is carried by the blank-carrying mechanism to the gripping-dies, in which its head is bent over, as indicated in Fig. 17, and it is then subjected to the action of the reciprocating heading-die, by which the finished nail, as represented in Figs. 22, 23, 24, 25, 26, and 27, is formed. This operation of bending over the head of the blank, thereby changing its general outline from that shown in Fig. 16 to that represented in Fig. 17, is of great importance in the practical working of the machine, as the material which is to constitute the head of the nail is thereby equally distributed on each side of the axis of the shank, and the formation of the head by the action of the compressing-die is facilitated.

Proceeding now to a description of the feeding mechanism, it consists, essentially, of a cam, $h$, Figs. 1, 3, 4, 6, and 8, on the shaft G, which imparts an oscillating motion to the vertical swinging arm H, as indicated by the full and dotted lines in Fig. 5, and a pair of wire-feeding jaws, $i\ i'$, which are arranged to open and close at the proper time to feed the wire into the machine. The vertical swinging arm H is supported on a rock-shaft, $j$, Figs. 2 and 3, attached to the end of the frame of the machine by the lugs $k\ k'$. The vertical arm H is forced outward constantly by the pressure of the spring $l$, Fig. 5, attached to the arm and bearing against the frame, an adjusting-screw, $m$, Figs. 3 and 5, inserted in a lug on the bracket $f$, being arranged to limit the outward movement of the arm H. The jaw $i$ is rigidly secured to the upper part of the swinging arm H, while the jaw $i'$ is inserted in the movable arm $n$, pivoted to the upper part of the arm H, being arranged so as to be swung inward to clamp the wire between the two jaws by the action of the cam $o''$ on the shaft G.

The particular form of the arm H is best seen in Fig. 9, which represents it in vertical elevation, as seen from the inside. At its upper end the arm is provided with an offset or bend, $p''$, which extends over the pivoted arm $n$ and forms a yoke, within which the arm is pivoted so as to swing freely, being pressed outward, so as to open the jaws $i\ i'$, by means of the spring $r''$.

The jaws $i\ i'$ are represented in detail in Fig. 10, their inner or opposing faces being serrated or notched, to afford sufficient grip on the wire. The jaw $i$ is provided with the stem $q$, which is inserted in the offset part $p''$ of the arm H, a set-screw, $q'$, Figs. 6 and 7, being used to adjust it, and another set-screw to hold it in place and prevent its turning in its socket. The jaw $i$ is provided with a stem inserted and secured in the swinging arm $n$ in a similar manner. It will be observed that each of the jaws has a projecting lip, $s$, Fig. 10, which extends along the upper and lower edges of the opening between the jaws, and prevents the wire from escaping from between them. The end of the upper portion, $p''$, of the arm H is provided with the friction-piece $t$, which bears against the cam $h$, and which may be readily renewed in case it becomes worn. The end of the arm $n$ is also provided with the friction-piece $u$, attached thereto by means of a thumb-screw, which facilitates its removal, so that the jaws $i\ i'$ may be separated when the end of the coil of wire is introduced between them. The cam $o''$ on the shaft G consists of a collar having a portion of its inner face cut away, so as to permit of the opening of the arm $n$ by the spring $r''$ at the proper time when the vertical arm H is making its backward or outward movement. The cam $o''$ should be properly located on the shaft with reference to the cam $h$ to effect this result. As the swinging arm H moves away from the machine, the jaws $i\ i'$, being separated by the spring $r''$, travel outward free of the wire; but when the cam $h$ forces the arm H inward the face of the cam $o''$ closes the jaw $i'$ upon the wire, pressing it against the opposite jaw, $i$, and thereby gripping it firmly, so that it is fed forward into the machine the requisite distance for the production of the nail-blank.

Provision is made for limiting the inward movement of the arm H relatively to the frame by means of a set-screw, $v$, Fig. 8, inserted in a lug in the side of the arm, and the inner end of which bears against the frame, or a suitable stop thereon. By means of the set-screw $m$, Figs. 3 and 5, the travel of the upper end of the arm H away from the machine may be adjusted so as to feed the wire the proper distance for making blanks adapted to different sizes or styles of nails. The shaft G is provided with the collar $x$, Figs. 1, 3, and 6, which sustains the upper portion, $p''$, of the arm H and renders the grip of the jaws $i\ i'$ on the wire positive and unyielding, so that the feeding mechanism is rendered entirely certain and reliable in the performance of its function. The collar $x$ bears on the outside of the arm $p''$, while the collar $o$ bears on the outside of the swinging arm $n$, and as these two collars are formed integrally with the shaft G, or are rigidly secured thereon, the grip of the jaws $i\ i'$ on the wire is rendered entirely positive and free from slipping, so that the feeding mechanism cannot fail to feed the wire forward the prescribed distance every revolution of the shaft G. Previous to the entrance of the wire into the feeding mechanism it may be uncoiled or straightened by any suitable or preferred mechanism. I have found in practice that the wire is straightened sufficiently by passing it through a tube having a curvature opposite to that which the wire has received in coiling.

The mechanism for cutting and shearing the wire will be understood from an examination of Figs. 11 and 13, in connection with the diagrams, Figs. 20 and 21. There are two cutting-knives, $o\ o'$, which have a reciprocating motion to and from each other, produced from the cams $p\ p'$ on the shafts E and D, respectively. The knives are supported by the arms Q Q', pivoted at their lower ends on the conical pins $g\ g'\ g''\ g'''$, Fig. 4, inserted in the arms R R', extending downward from the bed-plate. The arms Q Q' carry also the gripping or holding dies $r\ r'$, located immediately below the cutters $o\ o'$, in which the blank is held by its shank during the operation of the heading-die $e$, Figs. 1 and 4. The shape of the arms Q Q' is best shown in Fig. 13, from which it will be seen that while they are both pivoted in the same vertical line directly below the opposing edges of the cutters when brought together to act on the wire, they are provided with the lateral extensions I' I'', which reach outward and carry at their outer extremities the friction-pieces $t\ t'$, against which the cams $p\ p'$ on the parallel shafts D and E act to force the cutters and gripping-dies inward toward each other. The arms Q Q' are drawn outward, so as to separate the knives and dies, by the springs S S', attached to the bed-plate, and connected with the outer ends of the arms by means of the rods $y\ y'$, Fig. 11. It will be observed that the shape of the cams $p\ p'$ is such as to give the arms Q Q' a double vibration for each revolution of the shafts E and D, the purpose of which arrangement is to permit the blank, when severed from the wire, to be carried downward by the fingers $s'\ s''$ of the blank-carrying mechanism and placed between the gripping-dies $r\ r'$, within which it is held while the nail-head is formed by the compressing die $e$. On each revolution the cutters $o\ o'$, acting on the wire in connection with the shearing-block K, Figs. 4, 20, and 21, sever a blank therefrom. The arms Q and Q' then swing outward, separating the cutters and the gripping-dies $r\ r'$, so as to permit the blank-carrying mechanism to transfer the blank from the cutters into the gripping-dies, which immediately close together again and seize the shank of the blank and hold it firmly during the operation of upsetting the head to form the $e$.

The arms Q Q' then move outward again, opening the cutters and gripping-dies, and permitting the discharge of the headed nail by the action of the vibrating discharger J', Figs. 4 and 43, and the feeding forward between the cutters of the amount of wire requisite for the next blank by the operation of the feeding mechanism already described, which is timed so as to perform its function properly relative to the movements of the cutters. The swinging arm Q is provided at its lower end with a boss, $a'$, having at either end conical recesses for the reception of the points of the centers $g\ g'$. In a similar manner the lower end of the arm Q' is supported by the centers $g''\ g'''$. The centers $g\ g''$ are inserted in a lug or arm, R, extending downward from the cross-bar of the frame at the feed end of the machine, being secured therein by set-screws or other suitable devices. The centers $g'\ g'''$ are inserted through suitable openings in the curved arm R', which extends downward and inward underneath the path traversed by the reciprocating cross-head $d$, which carries the heading-die $e$. The shape of the arm R' is indicated by the dotted lines in Fig. 13, it being attached to one of the longitudinal bars J of the frame of the machine. Provision is made for taking up the wear between the points of the centers and the bosses on the lower ends of the arms Q Q' by means of the screw $b'$, passing through a plate or washer, $d'$, Fig. 4, bearing against the outer ends of the centers $g'\ g'''$. The lower end of the arm Q' is bent inward below the lower part of arm Q, so as to bring their pivotal points underneath each other in the same vertical line. The arms Q Q' are arranged to bear on the cross-bar of the frame at the feed end of the machine at $i''$, Fig. 4, so as to sustain the strain caused by the upsetting of the head of the nail-blank by the die $e$. The outer ends of the extensions I' I'', Fig. 13, of the arms Q Q' are provided with the adjustable wedge-shaped friction-pieces $x'$, Figs. 1 and 13, which fit into suitable inclined recesses in the sides of the arms and bear against the frame, so that any wear can be taken up and any lateral vibration in the arms Q Q' during their reciprocating movement prevented.

The method of making the cut by which the blank is severed from the wire will be understood from an inspection of the diagrams, Figs. 20 and 21. The cutters $o\ o'$ are provided with cutting edges of a form adapted to sever the wire on the diagonal curved lines shown in Fig. 14; but the separation of the blank, Figs. 15 and 16, from the wire is not completed by the cutters $o\ o'$, as such operation would involve bringing the edges of the cutters in contact with each other, from which they would suffer injury. The arrangement is such, therefore, that the edges of the knives $o\ o'$ approach each other, but do not meet during their movements, the shearing of the blank from the wire being completed by giving the wire itself a lateral movement toward one or the other of the cutting-knives $o$ $o'$. The wire is supported during the cutting action of the knives $o$ $o'$ by a shearing-block, K, which is provided with a groove, $m'$, Fig. 20, on its lower face, adapted to receive the wire. After the wire has been partially severed by the knives $o$ $o'$, as indicated in Fig. 20, the shearing-block K is moved laterally, so as to complete the shearing of the blank from the wire against one of the knives.

In the machine herein described the shearing-block K moves toward the left hand from the position indicated in Fig. 20 to that indicated in Fig. 21, thereby completing the shearing of the wire and forming a blank having a flat surface on its cut side, substantially as indicated at $c'$, Fig. 15. This form of the blank insures greater strength in the shank of the finished nail, and facilitates the subsequent operation of holding the blank in the gripping-dies $r r'$, where the head is formed. The shearing-block K is placed immediately above the cutting-knives $o$ $o'$, being inserted in the inner end of the bent lever L, which receives a vibratory motion from the cam N, Figs. 1 and 3, on the shaft E, for the purpose of effecting the shearing or final separation of the blank from the wire. The shearing-block K is inserted in the inner end of the bent lever L in such position that its lower face comes immediately over the cutting-knives, being secured therein by the set-screw $f'$, and arranged to be adjusted vertically with reference to the knives by means of the set-screw $g'$, Figs. 18 and 19. The bent lever L is pivoted at O, Figs. 1 and 18, in suitable jaws in another lever, P, the outer end of which receives an up-and-down motion from a cam, $l'$, Fig. 3, on the shaft G, so that the face of the shearing-block K, after the shearing of the blank from the wire, is elevated or raised slightly away from the knives, for the purpose of relieving the strain on the upper sides of the cutting-knives $o$ $o'$ while they withdraw from each other. The object of this arrangement is to reduce the friction on the back of the knives, thereby materially facilitating the cutting operation and increasing the durability of the knives.

The lever P is provided at its outer end with a roller, $q''$, which receives motion from a cam, $l'$, on the shaft G at the proper time to hold the shearing-block down to its position nearest the knife, and which cam is so located on the shaft as to allow the shearing-block to rise upward under the influence of a spring, $w'$, Figs. 2 and 3. The lever P is pivoted on suitable centers inserted in the lugs E' E'', Figs. 18 and 19, attached to the frame of the machine. The inner end, F', of the lever P is provided with a jaw, which supports the pivot O, on which the lever L vibrates, and it also extends inward over the inner end of the lever L, as indicated at $r'''$, Fig. 18, for the purpose of sustaining the block K under the pressure caused by the action of the cutting-knives $o$ $o'$ on the wire. It will be observed that the shearing-block K thus receives a double oscillation, one in the horizontal direction, as represented in Figs. 20 and 21, for the purpose of shearing the wire, and the other in a vertical direction, in order to reduce the friction on the back of the knives.

Previous to the cutting operation the wire may be shaped or given a form which better adapts it to the formation of blanks designed to be further employed in the manufacture of nails. The various shapes which may be given to the wire are indicated by the cross-sections, Figs. 28, 29, 30, and 31. Provision is made for shaping the wire in two directions, either at right angles with the motion of the cutters or parallel thereto. In the first case the compression of the wire is effected by suitable jaws, $d^3$ $c^3$, Fig. 4, while, if it be desired to compress the wire parallel to the cutters $o$ $o'$, this is accomplished by means of the jaws $z'$, Fig. 4, inserted in the reciprocating arms Q Q'. The inner ends of the jaws $d^3$ $c^3$ are provided with a groove of the form corresponding to that which it is desired to give to the wire, and one or both of the jaws is provided with an adjusting-screw, $d^4$, Fig. 4, by which their opposing faces may be set at such distance from each other as will produce the desired shape in the wire.

As shown in the drawings, Fig. 4, the jaw $c^3$ is inserted in the cross bar at the feed end of the frame of the machine, while the upper jaw, $d^3$, is inserted in an opening formed in the lever L. As the lever rises and falls, the opposing faces of the jaws $d^3$ $c^3$ will open and close, thereby permitting of the feeding of the wire between them when open, and operating to shape the wire when they move toward each other. The jaws $z'$ operate in an exactly similar manner, their inner ends being provided with grooves of proper shape. The jaws $z'$ are inserted in suitable openings in the upper ends of the arms Q Q', and operate to give the wire the desired shape when these arms move toward each other. Suitable adjusting-screws may be employed to hold the jaws in place and to adjust them to the proper positions relatively to the wire. Either or both of these sets of jaws may be used at one time, according to the shape which it is desired to give to the wire. Before entering between the shaping-jaws the wire passes through an opening in the lower part of the lever P, which serves to guide the same, and after passing through the shaping jaws, but before arriving at the cutters, the wire passes through the hole in the lower end of the adjustable guide $u'$, Fig. 4, which serves, when the shearing-block K rises upward, to raise the wire slightly from the cutters, and thereby reduce the friction on the latter. The guide $u'$ is arranged to be adjusted up and down by means of the screw $e^3$, Fig. 4.

The shape of wire shown in Fig. 28 is particularly adapted to making nails with long thin shanks, and that in Fig. 31 to nails with thick shanks. Other forms may be given to the wire for particular purposes and particular forms of heads. The heading-die e, the inner end of which is provided with a recess corresponding with the shape of the head which it is desired to give to the nails, (see Figs. 22 to 27, inclusive,) is inserted in the slide or cross-head d, being held in place therein by means of the wedge u, Fig. 4, and the clamping-screw b''. The heading-die e is made adjustable to and from the gripping-dies r r' by means of the screw z, Figs. 1 and 4. The heading-die e is inserted in a groove in the slide d, the wedge-piece u, Figs. 4 and 34, being used in the groove below the die, for the purpose of adjusting it up and down. The screw b'', which holds the heading-die e down upon the wedge-piece u, is inserted in a strap, n'', attached to the slide and reaching over the die. The lower end of the screw b'' bears on a clamp-block, o''''.

Provision is made for adjusting the heading-die laterally by means of the wedge-shaped pieces I'', Fig. 34, extending along the sides of the jaw, and arranged to be forced downward, if necessary, by means of the adjusting-screws c''. The wedge u is adjusted lengthwise of the slide, so as to raise or lower the heading-die e, by means of the screw a'', Fig. 4. By these arrangements I am enabled to adjust the heading-die in every direction relatively to the gripping-dies.

The blank that has been cut from the wire, of substantially the form represented in Figs. 15 and 16, is carried by the nail-blank-carrying mechanism downward between the gripping-dies r r', by which the shank is seized and held during the operation of forming the head by the action of the reciprocating heading-die e. The blank is seized by the fingers s' s'' of the nail-blank-carrying mechanism before the shearing operation is completed, and is then carried downward by them between the knives o o', and inserted between the gripping-dies r r'. After the gripping-dies have closed on the shank of the blank the finger s' continues to descend for a short distance, for the purpose of bending over the head of the blank, so as to give it the form approximately represented in Fig. 17. By this operation of bending over the head of the blank prior to its compression into the desired shape of head by the action of the heading-die e the metal is properly distributed to form the head centrally on the shank, and the heading operation is rendered more certain and positive.

The nail-blank-carrying mechanism is represented detached, in elevation, in Fig. 12, being arranged to be operated from cams on the shaft D.

Proceeding now to a description of the blank-carrying mechanism, it consists, essentially, of two movable fingers, s' s'', which are mounted on pivoted levers operated by cams on the shaft D, so that the inner ends of the fingers will perform the movements indicated in Figs. 35 to 39, inclusive. In Fig. 35 the positions of the inner ends of the fingers s' s'', when the wire is being fed forward between the cutters o o', are represented, and it will be observed that the opposing faces of the fingers are separated, so as to permit the introduction of the wire between them. The next position of the fingers is indicated in Fig. 36, in which the ends of the fingers have closed upon the head of the blank, which they hold in position during the cutting operation. The fingers s' s'' then descend together, holding the blank between them, and carrying it downward from the cutters o o' to the gripping-dies r r'. This operation is indicated in Fig. 37. The next action of the fingers is the bending over of the head of the blank, as represented in Fig. 17, which is effected by a continued descent of the finger s' after the blank has been inserted between the gripping-dies r r', which have now seized and hold it firmly by its shank. This further downward movement of the finger s' is indicated by dotted lines in Fig. 37, the lower finger, s'', descending at the same time far enough to permit of the bending over of the head of the blank. The amount of downward movement given to the finger s' will determine the distance to which the head of the blank is bent over, and provision should be made for adjusting this movement by means of a friction-piece inserted between the lever U and the roller j' on the shaft D, by which the lever is operated. The fingers s' s'' then assume the position relative to each other indicated in Fig. 38, the finger s' rising and the finger s'' moving to the left hand, so as to allow the heading-die e to approach the gripping-dies r r' and compress the head on the blank. The fingers s' s'' retain this relative position, substantially as indicated in Fig. 38, while rising upward preparatory to seizing the next blank and carrying it downward between the gripping-dies. At the extremity of their upward travel the fingers s' s'' occupy the position indicated by the full lines in Fig. 39, when the finger s'' is moved toward the right hand preparatory to again assuming the positions indicated in Fig. 35, for a repetition of the operation of transferring the blank from the cutters to the gripping-dies.

In order to give the fingers s' s'' the requisite motions, as before described, and illustrated in Figs. 35 to 39, inclusive, the lever U, which carries the upper finger, s', is pivoted at $g^5$, Figs. 11 and 12, to a lug or arm attached to the frame of the machine and arranged to be operated by the cam h'' and the roller j' on the shaft D, and the lever V, which carries the lower finger, s'', is pivoted in the lower end of the connection k'', the upper end of which is pivoted to the lever U. The connection k'' permits the lever V to receive the horizontal movement necessary to withdraw the finger s'' out of the way of the heading-die e, as indicated in dotted lines in Fig. 33, the lower end of the connection swinging to the right at this time. This movement is effected by means of a cam on the shaft B, operating on an arm extending downward from the bar n''', Fig. 33, the inner end of the said bar being pivoted to the lower end of the connection $k''$. As the cam revolves, the finger $s''$ is drawn outward, or toward the right-hand in Figs. 11 and 12, for the purpose before mentioned. The arm V is forced inward constantly by a spring, W', Figs. 11 and 12, attached to the arm U by means of a screw and bearing against the connection $k''$, or a lug on the arm V. The finger $s'$ is secured in a slot or recess in the inner end of the arm U by means of the screws $t''$, an adjusting-screw, $i'''$, being employed to vary the vertical position of the finger $s'$. A friction-piece, $u''$, attached to the lever U, receives the impulse of the cam $h''$ on the shaft D, and also the additional movement which is imparted to the lever U by the roller $j'$ for the purpose of bending over the head of the blank, as before described. The friction-piece $u''$ is secured by a bolt to a lug on the side of the lever U. It will be observed that the inner ends of the levers U V terminate at a sufficient distance above the slide $d$ to permit the movement of the latter to and from the gripping-dies $r\ r'$, the fingers $s'\ s''$ extending downward and inward from the ends of the levers. The lever U swings about the pivotal point $g^5$ as a center, and during a certain portion of its movement the lever V has a corresponding movement, while at other times the lever V moves outward, as already described.

In order to afford a firm grip on the head of the blank, a notch or notches are formed in the opposing faces of the fingers $s'\ s''$. The finger $s''$ is secured in a suitable recess in the inner end of the lever V by means of one or more screws, $y''$, which are made of extra length, in order that their heads may be readily accessible. The movement of the lever V while it travels with the lever U is derived from the cam $h''$, the rear end of which, however, extends outward slightly, in order to cause the finger $s''$ to travel downward out of the way of the finger $s'$ at the time the latter is bending over the head of the blank under the action of the roller $j'$.

By means of the adjusting-screw $x''$ the amount of bending given to the head of the blank may be readily adjusted, even when the machine is in operation. The outer ends of the levers U and V are prevented from vibrating laterally by being connected together by a slotted guide, $z''$, Figs. 1 and 11.

The lever V may be provided with an adjustable friction-piece corresponding to $u''$ on the lever U. The outer ends of the levers U and V are drawn downward constantly by a spring, X, Fig. 2, one end of which is attached to the frame of the machine, while the other is connected to a rod, $p'''$, which extends upward and is pivoted to the outer end of the lever U. A spring, $q'''$, Figs. 2 and 11, is attached to the outer end of the arm V, and connected at its lower end to the rod $p'''$ by an adjustable arm, $s'''$. By this construction the outer ends of both of the levers are drawn downward by the spring X, while the lever V is allowed to move independently of the lever U. The levers U and V are firmly jointed together by means of the links $k''$, placed on both sides of the levers. The outer end of the sliding bar $n'''$ is sustained in a suitable guide attached to the frame. The spring W' forces the lever V and finger $s'$ to the left hand after the arm $i''''$, Fig. 33, on the bar $n'''$ is released from the cam $k'''$ on the shaft D.

In Fig. 32 I have represented a transverse section of one of the cutter-carrying arms on the line $z\ z$, Fig. 13, showing the manner of securing the cutters and gripping-dies in place. A strap, $a'''$, attached to the arm Q, receives the screw $b'''$, which bears on the block $e'''$ and holds the cutter $o$ and the gripping-die $r$ in place in a suitable groove or recess in the arm. The cutter $o$ may be adjusted lengthwise, so as to vary the distance of its edge from that of the opposing cutter, or to compensate for the grinding of the edge when dull, by means of the adjusting-screw $j'''$, Fig. 13, passing through a lug on the arm. In the same way the gripping-die $r$ may be adjusted lengthwise by means of the adjusting-screw $l'''$. The gripping-dies should be so adjusted relatively to each other that their faces will just touch when the arms Q Q' come together. Each die is provided with a tapering groove across its face, which are made of such a form that when closed together they will give the desired shape to the shank of the nail. The front sides of the dies next the heading-die $e$ may be slightly elevated around the grooves which receive the shanks. The cutters and gripping dies are adjusted laterally by means of the wedges $r^4$, Fig. 1, and $r^5$, Fig. 32, and adjusting-screw $r^6$, Fig. 1. On the side next the heading-die the cutter $o$ is forced toward the wedge $r^4$ by means of the screw $t'''$, Fig. 32, a block, $v'''$, being interposed between the inner end of the screw and the side of the cutter. In front of the gripping-die $r$ a wedge-shaped block, $w'''$, is placed, arranged to be forced downward by the screw $z'''$, acting through the block $v'''$. In this way the gripping-die is adjustably held in place in the arm Q, the construction being such as to admit of the independent adjustment of the cutters and gripping-dies relative to each other, while as the cutters are placed directly over the gripping-dies the distance through which it is necessary to transfer the blank is reduced to the least possible dimensions, and the travel of the blank-carrying mechanism being correspondingly short the movements can be made quickly and the machine run at high speed, so as to produce a large quantity of finished nails in a given time.

The shape of the cutters will be understood from an examination of Figs. 40, 41, and 42. The upper surface of the cutters is given a form corresponding with the curved diagonal lines on which the wire is cut to form the blank, a projecting ledge, $m''$, being left on the side next the heading-die. The cutter is sharpened by being ground on a bevel, the ledge $m''$ being beveled off sidewise, as represented in the figures.

After the operation of forming the heads on the nails has been completed, by the movement of the heading-die $e$ toward the grippers $r$ $r'$ the finished nail is discharged from the machine by a vibrating finger, U′, Figs. 4 and 11, attached to the shaft V′, which receives an oscillating movement from the cam W, Figs. 1 and 3, on the shaft G. As will be observed from an examination of Fig. 11, the arm U′ is curved or bent so as to pass over the bosses on the lower ends of the arms Q Q′, and so that the divided finger J′ at its upper end may pass between the dies $r$ $r'$, for the purpose of ejecting the nail therefrom. The movement of the arm U′ is made quickly at the proper time when the jaws K K′ are traveling away from each other. An arm, Y, attached to the shaft V, receives motion from the cam W, the return movement being secured by a spring, $s^4$, Fig. 3.

I claim—

1. The herein-described process of manufacturing solid-headed nails or tacks, consisting in forming headed blanks from a continuous wire or rod by cutting the wire on a diagonal line, in bending the heads of the blanks laterally, and in subsequently forming the nail-heads by compression in suitable dies, substantially as and for the purposes set forth.

2. The herein-described process of manufacturing solid-headed nails or tacks from a continuous wire or rod, consisting in compressing the rod into suitable shape, in forming headed blanks from the shaped rod by severing it on a diagonal line, and in subsequently forming the nail-heads by compression in suitable dies, substantially as and for the purposes set forth.

3. The herein-described process of manufacturing solid-headed nails or tacks from a continuous wire or rod, consisting in compressing the rod into suitable shape, in forming headed blanks from the shaped rod by severing it on a diagonal line, in bending the heads of the blanks laterally, and in subsequently forming the nail-heads by compression in suitable dies, substantially as and for the purposes set forth.

4. A step in the herein-described process of forming headed blanks adapted to be made into solid-headed nails or tacks, consisting in partially severing the wire on a diagonal line between two opposing cutters, and in completing the shearing of the blanks from the wire by moving it laterally against one of the cutters, substantially as described.

5. The herein-described process of manufacturing solid-headed nails or tacks from a continuous wire, consisting in partially severing the wire on a diagonal line between two opposing cutters, in completing the shearing of the blanks from the wire by moving it laterally against one of the cutters, and in subsequently forming the nail-heads by compression in suitable dies, substantially as described.

6. The herein-described process of manufacturing solid-headed nails or tacks from a continuous wire, consisting in partially severing the wire on a diagonal line between two opposing cutters, in completing the shearing of the blanks from the wire by moving it laterally against one of the cutters, in bending the heads of the blanks laterally, and in subsequently forming the nail-heads by compression in suitable dies, substantially as described.

7. The herein-described nail-blank N′, formed from wire by severing the same on a diagonal line, and having the surface $c'$ on the inside of the shank produced by the final shearing of the blank from the wire, substantially as described.

8. The combination, with the wire-feeding jaws $i$ $i'$, arranged to open and close on the wire and to reciprocate together toward and from the machine, of the shaft G, provided with flanges $o''$ and $x$, adapted to hold the jaws closed on the wire during their feeding movement, substantially as described.

9. The combination, with the swinging arm H, having offset arm $p''$, of the pivoted arm $n$, wire-feeding jaws $i$ $i'$, and shaft G, provided with cam H and flanges $o''$ and $x$, substantially as described.

10. The wire-feeding jaws $i$ $i'$, provided with lips $s$ $s$, arranged to prevent the escape of the wire from between the jaws, substantially as described.

11. The combination, with the pivoted levers Q Q′, arranged to reciprocate to and from each other, of the cutters $o$ $o'$, substantially as described.

12. The combination, with the pivoted levers Q Q′, of the cutters $o$ $o'$ and the gripping-dies $r$ $r'$, substantially as described.

13. The combination, with the pivoted levers Q Q′, of the cutters $o$ $o'$, gripping-dies $r$ $r'$, and the shafts D and E, provided with cams $p$ $p'$, adapted to impart a double reciprocation to the levers for each revolution of the shafts, substantially as described.

14. The combination, with the shafts D and E, provided with cams $p$ and $p'$, of the pivoted levers Q Q′, cutters $o$ $o'$, and adjustable wearing-plates $t$ $t'$, substantially as described.

15. The combination, with the cutters $o$ $o'$, arranged to act on opposite sides of the wire, of the laterally-movable shear-block K, substantially as described.

16. The combination, with the cutters $o$ $o'$, arranged to act on opposite sides of the wire, of the shear-block K, arranged to move away from the cutters to reduce the friction on them during their outward motion, substantially as described.

17. The combination, with the cutters $o$ $o'$, arranged to act on opposite sides of the wire, of the shear-block K, arranged to be moved laterally to shear the blank from the wire, and away from the cutters to reduce the friction thereon during their outward movement, substantially as described.

18. The combination, with the cutters $o$ $o'$, of the laterally-movable shear-block K, pivoted lever L, and cam N, substantially as described.

19. The combination, with the cutters $o$ $o'$, of the movable shear-block K and lever L, pivoted on the lever P, and suitable cams for actuating the levers, substantially as described.

20. The combination, with the cutters $o$ $o'$, of the shear-block K and lever L, arranged to impart a lateral movement to the shear-block, and the lever P, arranged to move the inner end of the lever L to and from the cutters, substantially as described.

21. The combination, with the shear-block K, of the lever L, pivoted to the lever P, provided with lug $r^3$, adapted to support the inner end of lever L, substantially as described.

22. The combination, with suitable wire-feeding and blank-cutting mechanism, of relatively-movable wire-shaping jaws, substantially as described.

23. The combination, with suitable wire-feeding and blank-cutting mechanism, of relatively-movable wire-shaping jaws arranged to operate on the wire between the feeding and cutting mechanisms, substantially as described.

24. The combination, with the cutters $o$ $o'$ and shear-block K, of the wire-shaping jaws $c^3$ $d^3$, substantially as described.

25. The combination, with the cutters $o$ $o'$, of the lever L, shear-block K, and the wire-shaping jaws $d^3$ $c^3$, substantially as described.

26. The combination, with the cutters $o$ $o'$, of the swinging arms Q Q' and the wire shaping jaws $z'$ $z'$, substantially as described.

27. The combination, with suitable wire-feeding mechanism, of the reciprocating cutters $o$ $o'$ and two pairs of wire shaping jaws arranged to act on the wire between the feeding mechanism and the cutters, substantially as and for the purposes set forth.

28. The combination, with the cutters $o$ $o'$, of the shear-block K, arranged to move to and from the knives, and the wire-guide $u'$, substantially as described.

29. The combination, with the cutters $o$ $o'$ and gripping-dies $r$ $r'$, of suitable blank-carrying mechanism, and a device for bending over the head of the blank after it has been placed in the gripping-dies, substantially as and for the purposes set forth.

30. The combination, with the cutters $o$ $o'$ and gripping-dies $r$ $r'$, of suitable blank-carrying mechanism, a device for bending over the head of the blank after it has been placed in the gripping dies, and the reciprocating head-forming die $e$, substantially as and for the purposes set forth.

31. The combination, with the cutters $o$ $o'$ and gripping dies $r$ $r'$, of suitable blank-carrying mechanism provided with traveling fingers $s'$ $s''$, one of which receives an additional movement after the blank has been transferred to the gripping-dies, for the purpose of bending over its head, substantially as described.

32. The combination, with the pivoted arms Q Q', of the cutters $o$ $o'$ and gripping-dies $r$ $r'$ and adjusting screws for adjusting the cutters and dies independently of each other, substantially as described.

33. The combination, with the shafts D and E, provided with double-acting cams $p$ $p'$, of the cutters $o$ $o'$, gripping-dies $r$ $r'$, and the arms Q Q', pivoted on the same line with the faces of the cutters and dies when closed together, substantially as described.

34. The combination, with the cutters $o$ $o'$ and gripping-dies $r$ $r'$, of the pivoted reciprocating arms Q Q', arranged to move in a guideway formed by a recess in the frame, and provided with adjustable wearing-plates $x'$, substantially as described.

35. The combination, with a suitable supporting-frame, A, of the shaft B, arranged to operate the heading-die $e$, the shafts D and E, and pivoted arms Q Q', provided with cutters $o$ $o'$ and gripping-dies $r$ $r'$, and arranged to receive support from the frame in a lateral direction during the operation of the heading-die, substantially as described.

LOUIS J. HIRT.

Witnesses:
LEWIS M. LOSS,
GEO. B. SELDEN.